(12) United States Patent
Spahr

(10) Patent No.: US 8,186,768 B2
(45) Date of Patent: May 29, 2012

(54) QUICK RELEASE, ESPECIALLY FOR BICYCLES

(75) Inventor: Stefan Spahr, Krähenbergstrasse (CH)

(73) Assignee: DT Swiss Inc., Grand Junction, CO (US)

( * ) Notice: Subject to any disclaimer, the term of this patent is extended or adjusted under 35 U.S.C. 154(b) by 83 days.

(21) Appl. No.: 11/643,648

(22) Filed: Dec. 20, 2006

(65) Prior Publication Data

US 2007/0154286 A1 Jul. 5, 2007

(30) Foreign Application Priority Data

Dec. 24, 2005 (DE) .................... 10 2005 062 702

(51) Int. Cl.
*B60B 35/00* (2006.01)

(52) U.S. Cl. ............... 301/124.2; 301/110.5; 403/374.4; 403/374.5

(58) Field of Classification Search ............... 301/110.5, 301/124.2; 280/279, 288; 411/402, 160, 411/161, 533; 403/373, 374.1, 374.2, 374.3, 403/374.4, 374.5, DIG. 4, DIG. 9, 322.4
See application file for complete search history.

(56) References Cited

U.S. PATENT DOCUMENTS

| | | | | |
|---|---|---|---|---|
| 2,511,985 A * | 6/1950 | Juy | ............... | 301/124.2 |
| 4,362,449 A * | 12/1982 | Hlinsky | ........... | 411/156 |
| 4,431,353 A * | 2/1984 | Capuano | ............ | 411/11 |
| 4,598,614 A * | 7/1986 | Kipp | ................ | 81/58.3 |
| 5,022,672 A * | 6/1991 | Kawai | .......... | 280/281.1 |
| 5,338,142 A | 8/1994 | Gonzales | | |
| 5,494,390 A * | 2/1996 | Gonzales | ........ | 411/368 |
| 5,533,232 A * | 7/1996 | Boyer | ............. | 16/422 |
| 5,597,279 A * | 1/1997 | Thomas et al. | ....... | 411/432 |
| 5,653,511 A * | 8/1997 | Herkoperec et al. | ........ | 301/124.2 |
| 5,676,227 A * | 10/1997 | Hugi | ............. | 192/64 |
| 5,813,258 A * | 9/1998 | Cova et al. | ....... | 70/225 |
| 5,865,560 A * | 2/1999 | Mercat et al. | ......... | 403/322.4 |
| 5,879,100 A * | 3/1999 | Winkler | ....... | 403/325 |
| 6,070,946 A * | 6/2000 | Holmes | ........ | 301/36.1 |
| 6,089,675 A * | 7/2000 | Schlanger | ......... | 301/124.2 |
| 6,260,931 B1 * | 7/2001 | Stewart | ........ | 301/124.2 |
| 6,886,894 B2 * | 5/2005 | Kanehisa et al. | ......... | 301/124.1 |
| 7,055,220 B2 * | 6/2006 | Bertani | ............ | 16/436 |
| 7,226,259 B2 * | 6/2007 | Harris | .......... | 411/150 |
| 7,462,007 B2 * | 12/2008 | Sullivan et al. | ........ | 411/231 |

FOREIGN PATENT DOCUMENTS

DE 821 007 11/1951

(Continued)

*Primary Examiner* — Kip T Kotter
(74) *Attorney, Agent, or Firm* — Greer, Burns & Crain, Ltd.

(57) ABSTRACT

A quick release for bicycles comprising a pull rod extending in the axial direction, an end element at a first end of the pull rod, a clamping element at the second end of the pull rod, and a tensioning device for tensioning the clamping element. The tensioning device comprises a lever for applying the clamping force and a tensioning sleeve with a transmitter portion for transmitting the clamping force to an engaging portion of the clamping element. The lever is positioned to be movable relative to the clamping element in the axial direction of the pull rod and against the biasing force of a biasing spring is movable outwardly in the axial direction of the pull rod from an engaged position to a turn position. In the turn position an angular position of the lever can be set independently of the state of tensioning.

18 Claims, 3 Drawing Sheets

FOREIGN PATENT DOCUMENTS

| | | |
|---|---|---|
| DE | 824 905 | 12/1951 |
| DE | 7618755 U1 * | 10/1976 |
| DE | 3347 433 A1 | 7/1985 |
| DE | 91 01 600.2 | 6/1991 |
| DE | 41 42 507 A1 | 12/1992 |
| IT | 463953 * | 6/1951 |

* cited by examiner

QUICK RELEASE, ESPECIALLY FOR BICYCLES

The invention relates to a quick release, in particular for bicycles. In cycling, and in particular in sports, and in the semi-professional and professional field, quick releases are used for quickly mounting and removing components. Although the invention will be described below with reference to bicycle wheels, it can be employed for attaching other components such as for mounting a saddle.

In the field of high-quality sports cycling, the stress tolerance and the weight play a decisive role. The users set great store on high-quality components where each gram of weight counts. Concurrently, safety is an important topic. A quick release must thus reliably secure the wheel. Checking the state of tensioning should at the same time be easy and quick.

Different quick releases for bicycles have become known in the prior art. In the quick release systems as presently known, the clamping force is applied by flipping an eccentric cam after presetting the clamping length by means of a nut and a limit stop.

A drawback of the known system is that the clamping length must first be set with the clamping nut. The clamping length and thus the clamping force can only be checked by flipping the eccentric cam. Thus a number of cycles is usually required until the proper clamping length and clamping force are obtained.

In contrast to this it is the object of the invention to provide a quick release for bicycles which offers greater ease of operation.

The inventive quick release is in particular provided for bicycles and serves in particular for mounting the wheels. The quick release comprises a pull rod extending in the axial direction, an end element at a first end of the pull rod, a clamping element at the second end of the pull rod, and a tensioning device for tensioning the clamping element. The tensioning device comprises a lever for applying the clamping force and a tensioning sleeve. The tensioning sleeve is provided with a transmitter portion for transmitting the clamping force to an engaging portion of the clamping element. The lever is positioned to be movable relative to the clamping element in the axial direction of the pull rod and against the biasing force of a biasing spring it is movable outwardly in the axial direction of the pull rod from an engaged position to a turn position in which an angular position of the lever can be set independently of the state of tensioning.

In the turn position an angular position of the lever can be altered while the quick release remains tensioned. It is not necessary to loosen the clamping force for altering the angular position.

The invention has considerable advantages. The invention allows a simple structure and easy operation. The clamping force of the quick release is determined by the clamping element. The lever for transmitting the clamping force can be set independently thereof at any selected angular position. The clamping force is independent of the biasing spring. The lever or tensioning lever can thus be set at a desired angular position e.g. aligned parallel to the fork or to the dropouts or to the seat stays without requiring any loosening and re-clamping. The clamping force applied to the tensioning lever is transmitted into a clamping force acting between the clamping element and the end element so as to retain the wheel in the frame or the fork respectively.

In the prior art, however, the eccentric cam must be flipped so as to unfasten the clamping of the wheel for setting the eccentric cam at a desired angular position. Then the eccentric cam is turned accordingly and subsequently clamped again.

In a preferred specific embodiment the engaging portion is configured as an external toothing, interacting in particular with a transmission portion configured as an internal toothing. The two toothings extend in particular over the entire circumference, thus allowing an efficient force transmission in clamping which acts not only in local spots but over the entire circumference or over the better part of the circumference. The large force transmission area ensures a long-lasting function. A high clamping force can be set reliably and reproducibly since during clamping the external and internal toothings for transmitting force are interlocked over a large contact area.

The engaging portion and the transmission portion may be configured as otherwise profiled bodies which allow a form-fit and are axially displaceable relative to one another in the direction of the pull rod.

The axial displacement in the direction of the pull rod between the engaged position and the turn position offers a considerable advantage that the engaging portion and the transmission portion can be in engagement over the entire circumference such that high torque can be transmitted without the risk of wear or overstrain on the engaged portions. The engaging and transmission portions which according to the invention extend over the entire circumference, e.g. in a circle around the pull rod, comprise relatively large areas so as to allow a slim structure for the individual elements while offering higher stress tolerance. The quick releases known from the prior art with loads applied to the force-transmitting components in localized spots are, however, subjected to considerably higher loads.

Preferred specific embodiments provide for the clamping element to comprise an internal thread interacting with an external thread on the pull rod. This allows a flexible setting of the clamping force.

The end element in particular comprises an internal thread interacting with an external thread of the pull rod. Then the end element is screwed onto one end and the clamping element, onto the other end.

The end element may be provided to be integral with the pull rod. In this case it does not require a thread. The free end of the pull rod of the quick release can be pushed onto a wheel. After pushing through, the clamping element is screwed on.

Preferably the tensioning device comprises a safety device to support the tensioning sleeve on the clamping element so as to be axially movable and secure against loss. This will ensure reliability of function. The lever may be brought into engagement and out of engagement with the clamping element while remaining safely supported on the tensioning device.

In preferred specific embodiments the biasing spring is positioned between the safety device and the end element.

The safety device in particular comprises an external thread interacting with an internal thread of the clamping element. The safety device may comprise a screw with a screw head for the screw head of the safety device to carry or support the biasing spring. The biasing spring configured in particular as a coil spring is supported at one end on the radially enlarged head of the safety device and at the other end preferably on a radially inwardly protruding shoulder inside the tensioning sleeve. Thus the tensioning sleeve is biased towards the clamping element. Preferably the safety device comprises a screw with a head retained thereat or a screw head and a radially inwardly protruding shoulder in the tensioning sleeve between which the biasing spring is located.

In particularly preferred specific embodiments the tensioning sleeve grasps the clamping element such that the clamping element is radially enclosed in the tensioning sleeve.

With conventional quick releases in particular in conjunction with disk brakes the temperature increases in braking may present a problem in the case that plastic components lie in or immediately adjacent to the force flow. Such large temperature fluctuations and heat flows may cause changes in the clamping force in conventional systems which in the worst case may result in system failure.

In the system according to the invention however, the components lying in the force flow and maintaining the clamping force in operation, are preferably of metal. This will enhance safety.

It is preferred for all of the embodiments to provide an axial annular gap between the engaging portion of the tensioning device and the clamping element. Such an annular gap offers considerable advantages. It causes a thermal decoupling of the tensioning lever and the clamping element. The heat flow into the tensioning lever is interrupted or at least reduced. For instance when a disk brake is employed, the high temperatures occurring can be conducted to the quick release in conventional systems. In conventional quick releases this may cause the clamping forces to vary due to thermal expansion of plastic components. Not so in the present system since the components maintaining the clamping consist of metal.

The annular gap offers another advantage in that passing air will cool both the clamping element and the tensioning lever with the tensioning sleeve. The tensioning lever will thus have a lower temperature than the systems known from the prior art. The air gap between the tensioning sleeve of the tensioning device and the clamping element inhibits heat flow which would result in the tensioning lever heating up. Although in the system according to the invention such heating-up of the tensioning lever would not cause any changes to the clamping length and/or the clamping force, it might impede manual operation and require the wearing of gloves for operating to prevent burns.

The tensioning lever is firmly connected with the tensioning sleeve and may be manufactured integrally.

Preferably all of the embodiments employ a lever consisting at least partially of plastic while the other components such as pull rod, end element and clamping element preferably consist of metal. Preferably the tensioning lever or the lever of the quick release consists at least partially of a fibrous composite material. In this way a reduced weight can be achieved which plays a major role in the high-quality range. One embodiment provides that only the tensioning lever, which is not in the force flow of the clamping force, is preferably made of plastic.

The tensioning lever may consist of metal, in particular a light metal. What is conceivable and preferred is, aluminum, magnesium and titanium and the like, and alloys from the materials indicated.

The pull rod in particular consists of stainless steel but it may for example be made of titanium or a titanium alloy.

In preferred specific embodiments the clamping element and/or the end element comprises a knurled wheel to ensure a tight fit at the dropouts.

The knurled wheel at the clamping element may in particular be positioned to be rotatable relative to the clamping element. This is highly advantageous since it will largely prevent damage to the dropouts of the bicycle. In tensioning the quick release this will ensure that said knurled wheel does not move on the surface of the body to be tensioned which would result in scratches and damage.

The knurled wheel is preferably mounted to be rotatable by way of an elastic ring, e.g. a sealing ring or an O-ring. The O-ring may be provided in a groove on the outer periphery of the clamping element onto which the knurled wheel is pushed. The radially inwardly through-hole of the knurled wheel will then be clamped on the sealing ring so as to prevent it from falling off. At the same time the knurled wheel can be turned with the O-ring.

In another preferred embodiment the clamping element and/or the end element comprise(s) a radially outwardly undercut. In the region of the undercut the outer diameter of the clamping element and/or the end element is smaller than the inner diameter of the knurled wheel. Furthermore the inner diameter of the knurled wheel is smaller than the outer diameter of the clamping element or the end element before the undercut such that the knurled wheel is supported to be rotatable and secure against loss. Preferably the knurled wheel comprises a chamfered edge.

The quick release preferably comprises at least one and in particular two tensioning springs provided on the pull rod. This facilitates centering the quick release.

The lever is in particular removable to inhibit illicit removal of a wheel equipped with the quick release. For detaching the lever, the safety device is removed such that the lever can be pulled off. As a protection from dirt etc. a cap may be slipped onto the clamping element.

The invention is furthermore directed at a wheel having a rim, a hub and a quick release for mounting the wheel to the frame of a bicycle, wherein the quick release comprises a pull rod extending in the axial direction and an end element at a first end of the pull rod, and a clamping element at the second end of the pull rod and a tensioning device for tensioning the clamping element. The tensioning device comprises a lever for applying the clamping force and a tensioning sleeve with a transmitter portion for transmitting the clamping force to an engaging portion of the clamping element. The lever is positioned to be movable relative to the clamping element in the axial direction of the pull rod and against the biasing force of a biasing spring it is movable outwardly in the axial direction of the pull rod from an engaged position to a turn position in which an angular position of the lever can be set independently of the state of tensioning.

In particular the wheel comprises a disk brake. The lever of the quick release is preferably thermally separated from the clamping element such that the lever can be made of a plastic material without the risk that a heating up of said plastic material would adversely affect the operation or the clamping force.

Further advantages and embodiments of the present invention follow from the embodiments which will now be explained with reference to the attached drawings.

Figure 1:
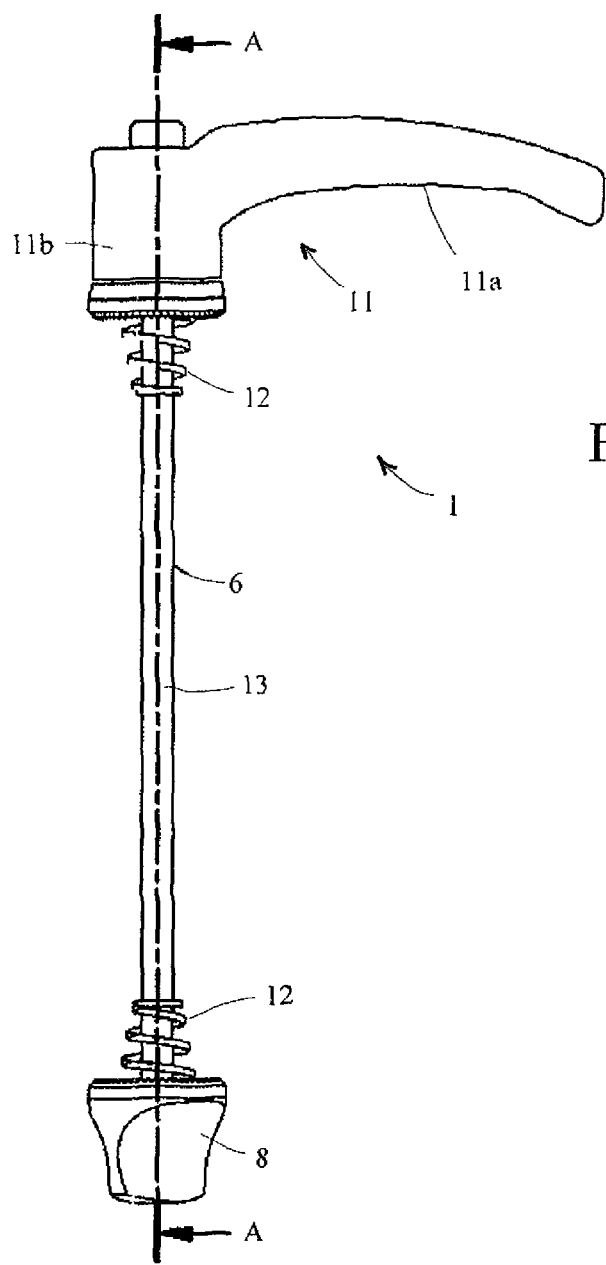
FIG. 1 is a quick release according to the invention.
Figure 2:
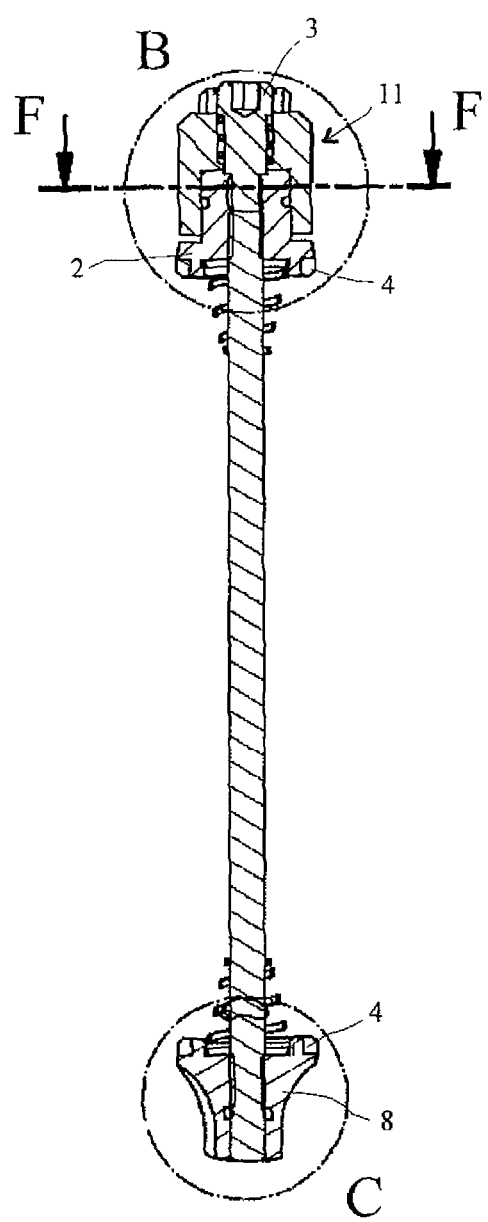
FIG. 2 is a section A-A of the quick release in FIG. 1.
Figure 3A:
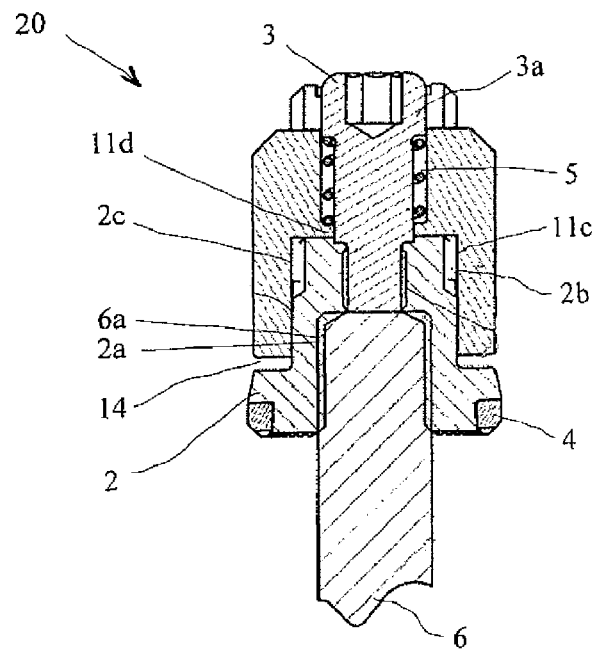
Figure 3B:
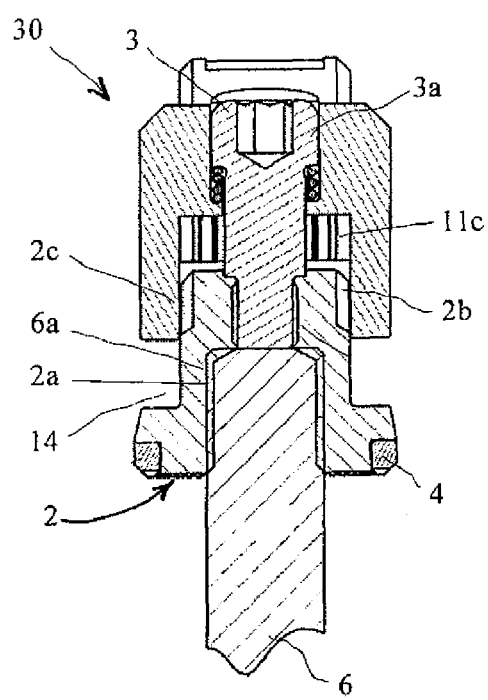
Figure 3C:
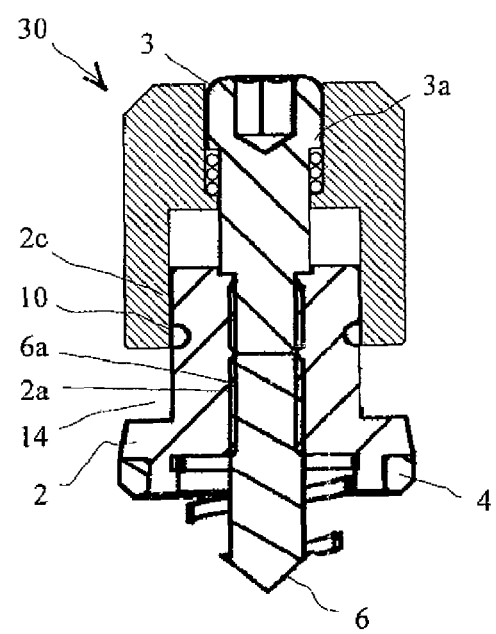
Figure 4:
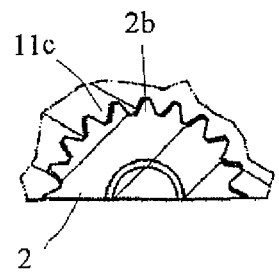
Figure 6:
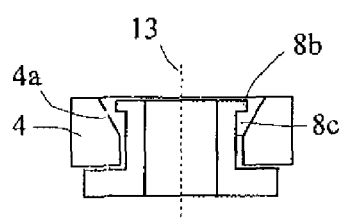
Figure 5:
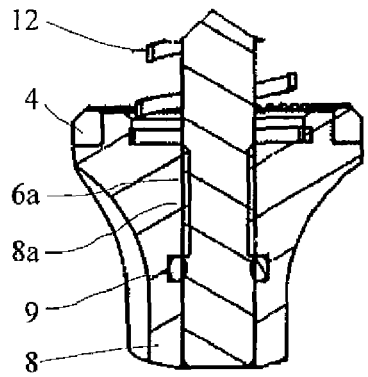
Figure 7:
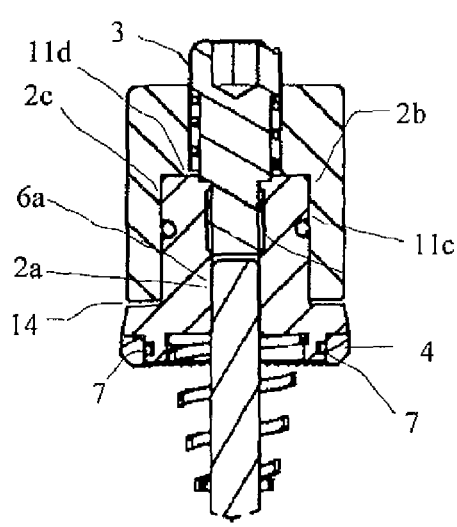
Figure 8:
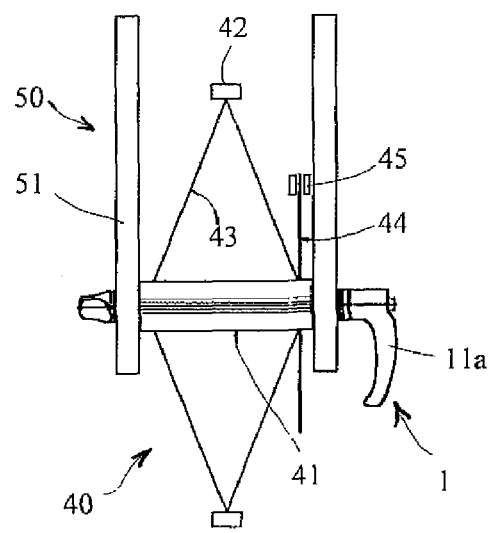

FIG. 3*a* is an enlarged illustration of detail B in FIG. 2 in the engaged position, FIG. 3*b* is an enlarged illustration of detail B in FIG. 2 in the turn position, FIG. 3*c* is an enlarged illustration of detail B in FIG. 2 in the turn position in an alternative embodiment, FIG. 4 is an enlarged illustration of section F-F of FIG. 2 in partial cross section, FIG. 5 is an enlarged illustration of detail C in FIG. 2, FIG. 6 is a simplistic schematic illustration of the knurled wheel, and FIG. 7 is an embodiment showing an alternative attachment of the knurled wheel, and FIG. 8 is a schematic view of a wheel according to the invention, With reference to the FIGS. 1 to 7, an embodiment of the quick release 1 according to the invention will now be described.

The quick release 1 serves to mount bicycle wheels to a frame or in the fork without tools, quickly and easily, with a sufficient clamping force.

The quick release 1 comprises a tensioning device 11 for applying the clamping force, a pull rod 6 extending through the wheel axle in operation and an end element in the form of a quick release nut 8.

The tensioning device 11 comprises a tensioning lever 11a with an integrally joined tensioning sleeve 11b. The tensioning sleeve 11b comprises an internal toothing 11c interlocked with the external toothing 2b of the clamping element 2 in the inactive state. The head 3a of a safety bolt 3 supports one end of a biasing spring 5 configured as a coil spring. The other end bears against a radially inwardly extending shoulder 11d of the tensioning sleeve 11b. The coil spring 5 biases toward the clamping element 2 the tensioning sleeve 11b which is displaceable in the direction of the center axis 13 of the push rod 6.

Against the force of the biasing spring 5 the tensioning lever 11a can be pulled axially outwardly in the direction of the pull rod 6. This will cause the internal toothing 11c to disengage from an external toothing 2b of the clamping element which extends over an axial, longitudinal portion 2c. The axial internal toothing 11c extends in the tensioning sleeve 11b over a longitudinal portion at substantially the same length at the end of the cylindrical gap.

The clamping force of the quick release 1 is independent of the tensioning force of the biasing spring 5. To increase the clamping force of the quick release 1 the clamping element 2 is turned by a rotary motion and by way of the internal thread 2a screwed further onto the pull rod 6 which is provided with an external thread 6a.

FIG. 3a illustrates an enlargement of detail B in FIG. 2. In the position shown in FIG. 3a the lever 11a and the clamping element 2 are in the engaging position 20. In this position, turning the clamping element 11b allows—depending on the turning direction—to increase or decrease the clamping force.

FIG. 3b illustrates detail B in the turn position 30 in which the lever 11a can be freely turned into any desired position.

In the embodiment of FIG. 3c the external toothing 2b extends over an axial, longitudinal portion 2c up to a groove where in this embodiment an O-ring 10 is placed. The axial internal toothing 11c in turn extends over a longitudinal portion of substantially the same length at the end of the cylindrical gap in the tensioning sleeve 11b. In this embodiment the O-ring 10 keeps dirt off the toothings 2b/11c to ensure a particularly reliable operation.

After adjusting the clamping force the tensioning lever 11a can be pulled off the clamping element 2 axially along the axis 13 such that the internal toothing 11c disengages from the external toothing 2b. The tensioning lever 11a can be freely turned in one direction and be brought into the desired angular position. After letting go, the tensioning lever 11a with the tensioning sleeve 11b is axially moved by the biasing force of the biasing spring 5 in the direction of the axis 13. The external toothing 2b returns into engagement with the internal toothing 11c and the angular position of the tensioning lever is thus fixed.

Positioning the tensioning lever 11a may occur in one step with tensioning or re-tensioning and will not influence the seat of the wheel. This is advantageous over the system having an eccentric cam known from the prior art.

In the conventional quick release systems the clamping force is built up after presetting the clamping length via nut/limit stop on a thread, by flipping an eccentric cam. The clamping length must be set first. As a rule this will occur iteratively until when the eccentric cam is flipped, the applied tensioning force corresponds to the desired clamping force. Then, to return the eccentric cam once more into the desired angular position, the eccentric cam must be flipped again—i.e. the wheel must be unfastened. Such increased effort is arduous and time-consuming in particular for a rider wanting to check the clamping force during a ride (e.g. just before departure)—which is certainly customary.

In the system known from the prior art the wheel must be unfastened—which may alter the mounting condition of the brakes (rim- and disk brakes) and the gear shifting system. Thereafter the eccentric cam must be flipped again. In the case of a too narrow clamping gap the clamping length must be corrected, i.e. the wheel must be unfastened yet again.

In the system of the invention only the clamping force needs to be checked. The quick release lever or tensioning lever 11a can be tightened concurrently without unfastening the quick release. Should the clamping force—against expectations—be too low, checking will also involve correction.

It is also an advantage of the novel quick release 1 that few and preferably only metal components build up and maintain the clamping force. The clamping force is thus hardly influenced by external conditions (time, temperature), unlike solutions having plastic elements in the force flow which are necessary in these places for example to minimize frictional forces in flipping the eccentric cam.

In conventional quick releases the time factor may result in plastic parts in the force flow settling i.e. causing actual alteration of the clamping length and thus the clamping force which in the worst case may result in system failure.

The novel system provides for the clamping force to build up as the tensioning lever 11a is tightened relative to the end element or the quick release nut 8.

The tensioning lever 11a and the tensioning sleeve 11b preferably consist of fiber-reinforced plastic. On the inner circumference of the tensioning sleeve 11b an axial internal toothing 11c is provided which is frictionally urged toward the clamping element 2 by an axially acting biasing spring 5 wherein the internal toothing 11c of the tensioning sleeve 11b comes into form-fit engagement with an external toothing 2b of the clamping element 2. The clamping element 2 comprises an internal thread 2a for a screw connection with an external thread 6a of the pull rod 2.

Between the tensioning sleeve 11b and the clamping element 2 there is provided an air gap or an annular gap 14 causing a thermal decoupling of the components. Simultaneously the air flowing through the annular gap will cool the components.

When the compressing force of the biasing spring 5 is overcome manually, the axial stroke of the tensioning lever 11a allows to adjust the angle of the lever 11a to suit the mounting condition or according to the wishes of the rider. After setting, the tensioning lever 11a is let go and the biasing spring 5 locks the quick release lever 11a back into place.

The knurled wheel 4 is placed to be rotatable relative to the clamping element 2 to prevent the knurled wheel 4 from eating into the frame or the fork.

The embodiment according to FIG. 6 ensures that the knurled wheel 4 remains rotatable by way of an outer diameter of the clamping element 2 which in the region of an undercut 8c is smaller than the inner diameter of the knurled wheel 4. Concurrently the inner diameter of the knurled wheel is smaller than the outer diameter 8b of the clamping element 2 or the end element 8 before the undercut 8a such that the knurled wheel 4 is supported to be secure against loss. The difference in diameters allows mounting while applying a suitable contact force. A greater ease of mounting is achieved through a chamfered edge 4a at the knurled wheel 4.

In the variant illustrated in FIG. 7, an O-ring 7 is provided on the clamping element 2 or the end element 8 to rotatably support and axially lock the knurled wheel 4 such that it will not be lost when removing the quick release.

All of the embodiments provide for tensioning springs 12 which facilitate mounting the wheel since they center the quick release unit.

The O-ring 9 in the groove of the tensioning nut or the end element 8 (see FIG. 5) results in a steady clamping force between the pull rod 6 and the tensioning nut. This will also facilitate mounting and prevent loss of the tensioning nut when the wheel is not mounted, i.e. when no clamping force acts on the quick release.

Solutions as presently known comprise instead of the O-ring 9, a plastic insert. The clamping force of said insert will, however, decrease with each manipulation and with age since a thread will form.

It is a considerable improvement that operation of the novel system is extremely easy. Dangerous operating errors often observed in other systems can largely be prevented since the novel system is more easily comprehensible to most users than building up clamping force by varying the clamping length and subsequently flipping an eccentric cam.

Mounting a wheel with the novel system is extremely easy. Tighten (if the mounting condition does not allow turning the lever 360°, this may be done as with a ratchet). Thereafter the lever 11a is pulled outwardly, turned into the desired position and let go again.

Removing the screw 3 allows to remove the lever 11. Illicit removal of the wheels will then be considerably inhibited. This is an advantage over conventional systems. After removing the lever, a protective cap can be fastened to cover the clamping element.

FIG. 8 is a simplistic schematic illustration of a wheel 40 according to the invention of a bicycle 50 according to the invention comprising two wheels and a frame.

The wheel 40 comprises a hub 41 and a rim 42 connected with the hub 41 through spokes 43. The frame 51 or a fork of the bicycle 50 has the wheel 40 attached to it by means of a quick release 1 according to the invention as described above.

In this embodiment the wheel 40 is equipped with a disk brake 44 which is activated through brake shoes 45 by a method not shown. The lever 11a of the quick release 1 is made of plastic while the components of the quick release 1 intended for clamping are made of metal. Since an annular gap 14 exists between the tensioning sleeve 11b and the clamping element 2 the lever 11a is thermally decoupled and additionally cooled by the air flowing through. This is advantageous in the present case since braking generates a considerable heat flow at the disk brake 44 which can thus not adversely affect the operation or handling of the quick release.

The invention claimed is:

1. A quick release for bicycles, comprising:
    a pull rod extending in the axial direction, a removable end element directly connected to a first end of the pull rod, a clamping element connected to a second end of the pull rod, and a tensioning device for tensioning the clamping element;
    said tensioning device including a removable lever for applying a clamping force, an outermost surface protruding beyond an outer surface of said lever for enabling a user to apply a pushing force on said second end of the pull rod while pulling on said lever, and a tensioning sleeve with a transmitter portion for transmitting the clamping force to an engaging portion of the clamping element, said tensioning sleeve including at least one radially, inwardly extending shoulder integrally formed therewith for supporting an end of at least one biasing spring, wherein an annular axially extending gap is defined between the tensioning device and a radially, outwardly extending flange portion of the clamping element; and
    a pair of tensioning springs configured for centering said clamping element, said tensioning device and said pull rod relative to a wheel, wherein one of said tensioning springs is on said first end of said pull rod and said other of said tensioning springs is on said second end of said pull rod,
    wherein the lever is positioned to be movable relative to the clamping element in the axial direction of the pull rod and is movable outwardly in the axial direction of the pull rod from an engaged position to a turn position in which an angular position of the lever can be set independently of the state of tensioning.

2. The quick release of claim 1, wherein said lever and said clamping element are connected together by a fastener.

3. A quick release for bicycles, comprising:
    a pull rod extending in the axial direction, a removable end element directly connected to a first end of the pull rod, a clamping element connected to a second end of the pull rod, and a tensioning device for tensioning the clamping element;
    said tensioning device including a lever for applying a clamping force, an outermost surface protruding beyond an outer surface of said lever for enabling a user to apply a pushing force on said second end of the pull rod while pulling on said lever, and a tensioning sleeve with a transmitter portion for transmitting the clamping force to an engaging portion of the clamping element, said tensioning sleeve including at least one radially, inwardly extending shoulder integrally formed therewith for supporting an end of at least one biasing spring, wherein an annular axially extending gap is defined between the tensioning device and a radially, outwardly extending flange portion of the clamping element; and
    a knurled wheel rotatably mounted on the clamping element, said knurled wheel being made of metal and including a first diameter and a second diameter, wherein said first diameter and said second diameter are connected by a chamfered edge on an inner surface of said wheel that is spaced from said clamping element, said first diameter being greater than a diameter of said clamping element to allow rotation of said knurled wheel relative to said clamping element, said second diameter being less than said diameter of said clamping element to secure said knurled wheel on said clamping element;
    wherein the lever is positioned to be movable relative to the clamping element in the axial direction of the pull rod and is movable against the biasing force of said at least one biasing spring outwardly in the axial direction of the pull rod from an engaged position to a turn position in which an angular position of the lever can be set independently of the state of tensioning.

4. The quick release according to claim 3, wherein the engaging portion is configured as an external toothing.

5. The quick release according to claim 3, wherein the transmitter portion is configured as an internal toothing.

6. The quick release according to claim 3, wherein the clamping force is independent of the said at least one biasing spring.

7. The quick release according to claim 3, wherein the clamping element comprises an internal thread interacting with an external thread of the pull rod.

8. The quick release according to claim 3, wherein the end element comprises an internal thread interacting with an external thread of the pull rod.

9. The quick release according to claim 3, wherein the tensioning device comprises a safety device to support the tensioning sleeve on the clamping element to be axially movable and secure against loss.

10. The quick release according to claim 9, wherein the safety device comprises an external thread interacting with an internal thread of the clamping element.

11. The quick release according to claim 3, wherein said at least one biasing spring is supported between a safety device and the end element.

12. The quick release according to claim 3, wherein an axial annular gap is provided between the transmitter portion of the tensioning sleeve and the clamping element.

13. The quick release according to claim 3, wherein the lever is at least partially made of plastic.

14. The quick release according to claim 3, wherein the lever is at least partially made of a fibrous composite material.

15. The quick release according to claim 3, wherein at least one tensioning spring is provided.

16. The quick release according to claim 1, wherein the knurled wheel is positioned on a sealing ring.

17. The quick release according to claim 3, wherein the lever is removable after removing a safety device to inhibit illicit removal of a wheel.

18. A wheel having a rim and a hub wherein a quick release is provided for mounting the wheel to a bicycle, the quick release comprising:

a pull rod extending in the axial direction and an end element connected directly to a first end of the pull rod, a clamping element connected to a second end of the pull rod and a tensioning device for tensioning the clamping element, the clamping element defining a groove configured to receive a first sealing ring to form a seal between the clamping element and the tensioning device;

the tensioning device including a lever for applying the clamping force, an outermost surface protruding beyond an outer surface of said lever for enabling a user to apply a pushing force on said second end of the pull rod while pulling on said lever, and a tensioning sleeve with a transmitter portion for transmitting the clamping force to an engaging portion of the clamping element, said tensioning sleeve including at least one radially, inwardly extending shoulder integrally formed therewith for supporting an end of at least one biasing spring, wherein an annular axially extending gap is defined between the tensioning device and a radially, outwardly extending flange portion of the clamping element;

a knurled wheel made of metal and rotatably mounted on the clamping element, said knurled wheel having a first diameter and a second diameter, wherein said first diameter and said second diameter are connected by a chamfered edge on an inner surface of said wheel that is spaced from said clamping element, said first diameter being greater than a diameter of said clamping element to allow rotation of said knurled wheel relative to said clamping element, said second diameter being less than said diameter of said clamping element to secure said knurled wheel on said clamping element; and a second sealing ring provided between the knurled wheel and the clamping element and configured to support and axially lock the wheel in position;

wherein the lever is positioned to be movable relative to the clamping element in the axial direction of the pull rod and against the biasing force of a biasing spring is movable outwardly in the axial direction of the pull rod from an engaged position to a turn position in which the angular position of the lever can be set independently of the state of tensioning.

* * * * *